United States Patent
Itoh et al.

(10) Patent No.: US 8,492,011 B2
(45) Date of Patent: Jul. 23, 2013

(54) LUBRICANT COMPOUND FOR A MAGNETIC DISK, MAGNETIC DISK, AND METHOD OF MANUFACTURING THE SAME

(75) Inventors: Kae Itoh, Tokyo (JP); Katsushi Hamakubo, Tokyo (JP); Koichi Shimokawa, Tokyo (JP)

(73) Assignee: WD Media (Singapore) Pte, Ltd., Singapore (SG)

( * ) Notice: Subject to any disclaimer, the term of this patent is extended or adjusted under 35 U.S.C. 154(b) by 241 days.

(21) Appl. No.: 12/732,945

(22) Filed: Mar. 26, 2010

(65) Prior Publication Data

US 2010/0246064 A1 Sep. 30, 2010

(30) Foreign Application Priority Data

Mar. 27, 2009 (JP) ................................. 2009-080430
Mar. 24, 2010 (JP) ................................. 2010-067387

(51) Int. Cl.
 *G11B 5/66* (2006.01)
(52) U.S. Cl.
 USPC ......... 428/835.8; 508/579; 508/590; 427/131
(58) Field of Classification Search
 USPC ................. 508/477, 478, 479, 480, 483, 579, 508/588, 590; 428/835.8
 See application file for complete search history.

(56) References Cited

U.S. PATENT DOCUMENTS

| 5,536,578 | A  | * | 7/1996 | Shoji et al. | 428/408 |
| 6,238,780 | B1 | * | 5/2001 | Wu et al. | 428/213 |
| 6,759,148 | B2 |   | 7/2004 | Tanahashi et al. | |
| 2007/0225183 | A1 | * | 9/2007 | Sasa et al. | 508/582 |
| 2010/0028721 | A1 | * | 2/2010 | Hamakubo et al. | 428/848 |
| 2010/0029889 | A1 | * | 2/2010 | Yamane et al. | 528/25 |
| 2011/0015107 | A1 | * | 1/2011 | Marchionni et al. | 508/465 |

FOREIGN PATENT DOCUMENTS

| EP | 0152744 A1 | 8/1985 |
| EP | 0844603 A1 | 5/1998 |
| EP | 2157117 A1 | 2/2010 |
| JP | 62-66417 A | 3/1987 |
| JP | 2002-074648 A | 3/2002 |

OTHER PUBLICATIONS

"Fomblin Z Derivatives Product Data Sheet," Solvay Solexis, Dec. 13, 2002, pp. 1-3.*
English Abstract of WO 2008/038799, Apr. 2008.*
Examination and Search Report from Singapore Patent Application No. 201002104-6 dated Jun. 20, 2011, 10 pages.

* cited by examiner

*Primary Examiner* — Holly Rickman

(57) ABSTRACT

In a magnetic disk that has at least a magnetic layer, a carbon-based protective layer, and a lubricating layer formed in this order over a substrate, the lubricating layer contains a lubricant compound including a compound which has a perfluoropolyether main chain in a structure thereof, an aromatic group located at a position except each end of a molecule thereof, and a polar group at each end of the molecule.

9 Claims, 1 Drawing Sheet

LUBRICANT COMPOUND FOR A MAGNETIC DISK, MAGNETIC DISK, AND METHOD OF MANUFACTURING THE SAME

This application is based upon and claims the benefit of priority from Japanese Patent Application No. 2009-080430, filed on Mar. 27, 2009, and Japanese Patent Application No. 2010-067387, filed on Mar. 24, 2010, the disclosures of which are incorporated herein in their entirety by reference.

TECHNICAL FIELD

This invention relates to a magnetic disk adapted to be mounted in a magnetic disk device such as a hard disk drive (hereinafter abbreviated as a HDD) and to a method of manufacturing the same and further relates to a lubricant compound for a magnetic disk.

BACKGROUND ART

Various information recording techniques have been developed following the increase in volume of information processing in recent years. Particularly, the areal recording density of HDDs using the magnetic recording technique has been increasing at an annual rate of about 100%. Recently, the information recording capacity exceeding 250 GB has been required per 2.5-inch magnetic disk adapted for use in a HDD or the like. In order to satisfy such a requirement, it is necessary to realize an information recording density exceeding 400 Gbits/inch$^2$. In order to achieve the high recording density in a magnetic disk for use in a HDD or the like, it is necessary to reduce the size of magnetic crystal grains forming a magnetic recording layer serving to record information signals, and further, to reduce the thickness of the layer. However, in the case of conventionally commercialized magnetic disks of the in-plane magnetic recording type (also called the longitudinal magnetic recording type or the horizontal magnetic recording type), as a result of the reduction in size of magnetic crystal grains, there has been the occurrence of a thermal fluctuation phenomenon where the thermal stability of recorded signals is degraded due to superparamagnetism and where the recorded signals are lost. This has been an impeding factor for the increase in recording density of the magnetic disks.

In order to solve this impeding factor, magnetic recording media of the perpendicular magnetic recording type have been proposed in recent years. In the case of the perpendicular magnetic recording type, as is different from the case of the in-plane magnetic recording type, the easy magnetization axis of a magnetic recording layer is adjusted so as to be oriented in a direction perpendicular to the surface of a substrate. As compared with the in-plane magnetic recording type, the perpendicular magnetic recording type can suppress the thermal fluctuation phenomenon and thus is suitable for increasing the recording density. As such a perpendicular magnetic recording medium, there is known a so-called two-layer perpendicular magnetic recording disk comprising, over a substrate, a soft magnetic underlayer made of a soft magnetic substance and a perpendicular magnetic recording layer made of a hard magnetic substance, as is described in, for example, JP-A-2002-74648.

In the meantime, a conventional magnetic disk is provided with a protective layer on a magnetic recording layer formed over a substrate and further with a lubricating layer on the protective layer in order to ensure the durability and reliability of the magnetic disk. Particularly, the lubricating layer used at the outermost surface is required to have various properties such as long-term stability, chemical substance resistance, anti-friction property, and heat resistance.

In order to satisfy such a requirement, perfluoropolyether-based lubricants having hydroxyl groups in molecules have often been used as lubricants for magnetic disks. For example, according to JP-A-62-66417 (Patent Document 1) or the like, there is well known a magnetic recording medium or the like coated with a perfluoroalkylpolyether lubricant having a structure of $HOCH_2CF_2O(C_2F_4O)_p(CF_2O)_qCF_2CH_2OH$ containing hydroxyl groups at both ends of a molecule. It is known that when hydroxyl groups are present in molecules of a lubricant, the lubricant has excellent adhesion to a protective layer due to the interaction between the protective layer and the hydroxyl groups.

SUMMARY OF THE INVENTION

As described above, the information recording density exceeding 400 Gbits/inch$^2$ has been required in recent HDDs. In order to effectively use the limited disk area, use has been made of a HDD of the LUL (load/unload) system, as a HDD start/stop mechanism, instead of a conventional HDD of the CSS (contact start/stop) system. In the LUL system, a magnetic head is retreated to an inclined platform called a ramp located outside a magnetic disk while the HDD is stopped, then in a start-up operation, the magnetic head is caused to slide from the ramp, after the magnetic disk starts to rotate, so as to fly over the magnetic disk to perform recording/reproduction. In a stop operation, the magnetic head is retreated to the ramp outside the magnetic disk, then the rotation of the magnetic disk is stopped. This sequence of the operations is called a LUL operation. In the magnetic disk mounted in the HDD of the LUL system, it is not necessary to provide a contact sliding region (CSS region) for the magnetic disk, which is required in the CSS system, thus it is possible to increase a recording/reproducing region, and therefore, the LUL system is preferable for increasing the volume of information as compared with the CSS system.

In order to improve the information recording density under these circumstances, it is necessary to reduce a spacing loss as much as possible by reducing the flying height of the magnetic head. In order to achieve the information recording density exceeding 400 Gbits/inch$^2$, it is necessary to set the flying height of the magnetic head to 5 nm or less. In the LUL system, as is different from the CSS system, since it is not necessary to provide an uneven shape for CSS on the surface of the magnetic disk, it is possible to extremely flatten the surface of the magnetic disk. Consequently, in the case of the magnetic disk mounted in the HDD of the LUL system, the flying height of the magnetic head can be further reduced as compared with the CSS system and therefore there is also an advantage that it is possible to increase the S/N ratio of a recording signal and thus to contribute to an increase in recording capacity of the HDD.

Because of the further reduction in magnetic head flying height due to the recent introduction of the LUL system, it has become necessary that a magnetic disk stably operate even in the case of an ultra-low flying height of 5 nm or less. Especially, as described above, the magnetic disks have been shifted from the in-plane magnetic recording type to the perpendicular magnetic recording type in recent years, so that an increase in capacity of the magnetic disks and a resultant reduction of a flying height have been strongly demanded.

Recently, magnetic disk devices have started to be often used not only as conventional storage devices of personal computers, but also as storage devices for mobile applications such as mobile phones and car navigation systems and, therefore, due to diversification of applications, the environmental resistance required for magnetic disks has become very strict. Therefore, in view of these circumstances, it is urgently necessary, more than conventional, to further improve the durability of magnetic disks, the durability of lubricants forming lubricating layers, and so on.

With the rapid improvement in information recording density of magnetic disks in recent years, it is required to further reduce the magnetic spacing between a magnetic head and a recording layer of a magnetic disk in addition to the reduction in magnetic head flying height and, therefore, it has become necessary, more than conventional, to further reduce the thickness of a lubricating layer present between the magnetic head and the recording layer of the magnetic disk. A lubricant used as the lubricating layer at the outermost surface of the magnetic disk largely affects the durability of the magnetic disk. Even if the thickness of the lubricating layer is reduced, the stability and reliability are essential for the magnetic disk.

If polar groups such as hydroxyl groups are present in molecules of the lubricant, the lubricant has excellent adhesion to a carbon-based protective layer due to the interaction between the protective layer and the hydroxyl groups in the molecules of the lubricant and, therefore, use has preferably been made of a perfluoropolyether lubricant particularly having hydroxyl groups at both ends of molecules.

However, a conventional highly polar lubricant having the polar groups such as a plurality of the hydroxyl groups in the molecules tends to be subjected to aggregation due to the interaction between the molecules or the interaction due to attraction between the polar groups. The molecules of the lubricant subjected to the aggregation as described above are bulky and, as a result, it is difficult to obtain a lubricant layer of a uniform thickness unless the lubricant layer is thickened. This causes a problem that the reduction in magnetic spacing cannot be achieved. Further, presence of excessive polar groups to active sites on the protective layer tends to cause attraction of contaminants and the like and transfer or shift of the lubricant to the head to occur. Accordingly, if the magnetic disk is used with the magnetic head flying at an ultra-low flying height of, for example, 5 nm or less, failures are caused to occur in the HDD.

Further, because of the further reduction in magnetic head flying height following the increase in recording density in recent years, the possibility becomes high that contact or friction between the magnetic head and the surface of the magnetic disk frequently occurs. When the magnetic head is brought in contact with the surface of the magnetic disk, it may happen that the magnetic head does not immediately go out of contact with the surface of the magnetic disk, but slides with friction for a while. A slider of a currently used magnetic head contains alumina ($Al_2O_3$). It is known that the $CF_2O$ portion of the main chain of the above-mentioned perfluoropolyether-based lubricant tends to be decomposed by a Lewis acid such as alumina. Therefore, the perfluoropolyether-based lubricant used at the outermost surface of the magnetic disk may be decomposed at the $CF_2O$ portion of its main chain by alumina due to contact or the like with the magnetic head so that a reduction in molecular weight of the lubricant forming the lubricating layer tends to be promoted more than conventional. Thus, there is concern about the possibility that data read/write is subjected to a failure due to adhesion, to the magnetic head, of the lubricant decomposed to decrease in molecular weight. Further, in consideration of data recording/reproduction in the state where a magnetic head and a magnetic disk are in contact with each other in near future, the influence due to the constant contact is further concerned. If the lubricant forming the lubricating layer is decomposed into low molecules, the lubricant loses a lubricant property. Then, it is considered that the lubricant which loses the lubricant property is shifted and deposited on the magnetic head located in the extremely close positional relationship to make the flying posture of the magnetic head unstable, thus causing a fly stiction failure. Particularly, a recently introduced magnetic head with a NPAB (negative pressure air bearing) slider is considered to promote the transfer deposition phenomenon because it tends to suck the lubricant due to a strong vacuum created at the bottom surface of the magnetic head. The transferred and deposited lubricant may produce an acid such as hydrofluoric acid to thereby corrode an element portion of the magnetic head. Particularly, a magnetic head mounted with a magnetoresistive effect element tends to be corroded.

As described above, it is required to realize a magnetic disk excellent in long-term stability of a lubricating layer and having high reliability even with the reduction in magnetic spacing and the low flying height of a magnetic head following the increase in recording density in recent years and, further, due to diversification of applications and so on, the environmental resistance required for magnetic disks has become very strict. Therefore, it is required, more than conventional, to further reduce the thickness of a lubricating layer and, simultaneously, to further improve the properties such as the durability of a lubricant, forming the lubricating layer, that largely affects the durability of a magnetic disk, particularly the LUL durability and the alumina resistance (suppression of decomposition of the lubricant due to alumina).

This invention has been made in view of these conventional circumstances and has an object to provide a lubricant compound for a magnetic disk that can realize a further reduction in magnetic spacing, that is excellent in durability, particularly in LUL durability and alumina resistance, and that has high reliability even with the low flying height of a magnetic head following the rapid increase in recording density in recent years and with the very strict requirement for environmental resistance following the diversification of applications, and further to provide a magnetic disk using such a lubricant compound and a method of manufacturing such a magnetic disk.

As a result of intensive studies on a lubricant that largely affects the durability of a magnetic disk, the present inventors have found that the above-mentioned problems can be solved by the following inventions, and has completed this invention.

Specifically, this invention has the following constitutions.
(Constitution 1)
A lubricant compound to be contained in a lubricating layer of a magnetic disk having at least a magnetic layer, a protective layer, and the lubricating layer formed in this order over a substrate, wherein the lubricant compound comprises a compound which has a perfluoropolyether main chain in a structure thereof, an aromatic group located at a position except each end of a molecule thereof, and a polar group at each end of the molecule.
(Constitution 2)
The lubricant compound according to constitution 1, wherein the compound further contains a polar group located at a position adjacent to the aromatic group.
(Constitution 3)
The lubricant compound according to constitution 1 or 2, wherein the number of polar groups in the molecule of the compound is 7 or less.

(Constitution 4)
The lubricant compound according to any one of constitutions 1 to 3, wherein the polar group is a hydroxyl group.
(Constitution 5)
The lubricant compound according to any one of constitutions 1 to 4, wherein a number-average molecular weight of the compound contained in the lubricating layer falls within a range of 1,000 to 10,000.
(Constitution 6)
A magnetic disk having at least a magnetic layer, a protective layer, and a lubricating layer formed in this order over a substrate,
wherein the lubricating layer contains the lubricant compound according to any one of constitutions 1 to 5.
(Constitution 7)
The magnetic disk according to constitution 6, wherein the protective layer is a carbon-based protective layer formed by a plasma CVD method.
(Constitution 8)
The magnetic disk according to constitution 7, wherein the protective layer includes nitrogen at a part contacted with the lubricant layer.
(Constitution 9)
The magnetic disk according to any one of constitutions 5 to 8, wherein the magnetic disk is adapted to be mounted in a magnetic disk device of a load/unload system as a start/stop mechanism.
(Constitution 10)
A method of manufacturing a magnetic disk having at least a magnetic layer, a protective layer, and a lubricating layer formed in this order over a substrate,
wherein the lubricating layer is formed by forming on the protective layer a film of a lubricant composition containing the lubricant compound according to any one of constitutions 1 to 5.
(Constitution 11)
The method according to constitution 10, comprising carrying out ultraviolet irradiation or carrying out both ultraviolet irradiation and heat treatment to the magnetic disk after forming the lubricating layer.

According to constitution 1, a lubricant compound is formed by a compound which has a perfluoropolyether main chain in a structure thereof, an aromatic group located at a position except each end of a molecule thereof, and a polar group at each end of the molecule. If such a lubricant compound is formed into a film on the protective layer of the magnetic disk, it is considered that the aromatic groups of the lubricant molecules and the protective layer approach each other due to π-π interaction therebetween and, by this interaction, the lubricant adheres to the protective layer. That is, by introducing the aromatic groups at the position except each end of the lubricant molecules, it is possible to allow the lubricant to be stably present on the medium in the state where the bulkiness of the lubricant molecules is minimized and the lubricant molecules are more flattened. Therefore, when applied on the disk surface, the lubricant molecules are fixed at the position of each aromatic group to the protective layer, which makes it possible to form the lubricating layer suppressed in bulkiness of the lubricant molecules on the protective layer and thus to form the thin lubricating layer. Further, it is possible to form the lubricating layer that can sufficiently cover the surface of the protective layer (the lubricating layer with a high coverage ratio) even if the thickness of the lubricating layer is reduced. Further, when applied on the disk surface, the lubricant molecules are fixed to the protective layer at the position of each aromatic group and stably exist on a recording medium in a more flattened state. This suppresses the interaction between the molecules of the lubricant or the interaction due to attraction between the polar groups of the lubricant. Therefore, the polar groups (e.g. hydroxyl groups) present at the ends of the lubricant molecules are effectively bonded to active sites on the protective layer and thus the adhesion of the lubricating layer can be improved.

Since the lubricant compound of this invention has the aromatic groups in the molecules thereof and a Lewis acid such as alumina is preferentially attracted to the aromatic groups in the molecules, decomposition at main chain portions of the perfluoropolyether-based lubricant due to alumina does not easily occur and, as a result, there are obtained the alumina resistance and the LUL durability that can ensure sufficient long-term stability.

That is, according to this invention, since it is possible to form a lubricating layer in the form of a thin uniform coating film having high adhesion to a protective layer, a further reduction in magnetic spacing can be realized. Further, a lubricant compound of this invention is also excellent in alumina resistance and thus there is obtained a magnetic disk having high reliability even with the low flying height (5 nm or less) of a magnetic head following the rapid increase in recording density in recent years and with the very strict requirement for environmental resistance following the diversification of applications.

As mentioned in constitution 2, it is preferable that the compound further contains a polar group at a portion adjacent to the aromatic group. By the occurrence of suitable interaction between the polar groups (e.g. hydroxyl groups) present at the positions adjacent to the aromatic groups in the lubricant molecules and the protective layer, it is possible to further enhance the above-mentioned function, by the aromatic groups, of allowing the lubricant to be stably present on the medium in the state where the bulkiness of the lubricant molecules is minimized and the lubricant molecules are more flattened. Further, this also contributes to improving the adhesion of the lubricating layer.

As mentioned in constitution 3, it is preferable that the number of polar groups in the molecule of the compound is 7 or less. This is because if the number of polar groups in a single molecule is too large (for example, if the polar groups within a single molecule exceed 7), there is a possibility that the interaction between the molecules of the lubricant or the interaction (interaction in a molecule) due to attraction between the polar groups of the lubricant becomes too large. In addition, excessive polar groups tend to induce attraction of the contaminants and the like and transfer or shift of the lubricant to the head to occur.

As recited in constitution 4, particularly a hydroxyl group is preferable as the polar group of the compound. This is because the hydroxyl group has a large interaction with the protective layer, particularly a carbon-based protective layer, and thus can enhance the adhesion between the lubricating layer and the protective layer.

As recited in constitution 5, if is preferable that a number-average molecular weight of the compound contained in the lubricating layer falls within a range of 1,000 to 10,000. Within the above-mentioned range, it is possible to provide recoverability based on appropriate viscosity, a suitable lubricating property, and, further, excellent heat resistance.

As recited in constitution 6, a magnetic disk having a lubricating layer containing the lubricant compound according to this invention can realize a further reduction in magnetic spacing, is excellent in durability, particularly in LUL durability and alumina resistance, and has high reliability even with the low flying height of a magnetic head following the rapid increase in recording density in recent years and with the very strict requirement for environmental resistance following the diversification of applications.

As mentioned in constitution 7, the protective layer is a carbon-based protective layer formed by a plasma CVD method. According to the plasma CVD method, the carbon-based protective layer with a uniform and dense surface can be formed, which is suitable for this invention.

As recited in constitution 8, it is preferable that the protective layer includes nitrogen at a part contacted with the lubricant layer because adhesion of the protective layer to the lubricant layer can be improved.

As recited in constitution 9, the magnetic disk of this invention is suitable as a magnetic disk adapted to be mounted in a magnetic disk device of, particularly, the LUL system. Because of the further reduction in magnetic head flying height due to the introduction of the LUL system, the magnetic disk is required to stably operate even in the case of an ultra-low flying height of, for example, 5 nm or less. Therefore, the magnetic disk of this invention having high reliability even with the low magnetic head flying height is suitable therefor.

As recited in constitution 10, the magnetic disk of this invention capable of realizing the reduction in magnetic spacing and having high reliability even with the low magnetic head flying height is obtained by a method of manufacturing a magnetic disk having at least a magnetic layer, a protective layer, and a lubricating layer formed in this order over a substrate, wherein the lubricating layer is formed by forming on the protective layer a film of a lubricant composition containing the lubricant compound according to this invention.

As recited in constitution 11, in the magnetic disk manufacturing method of constitution 10, the magnetic disk may be subjected to ultraviolet irradiation or to both ultraviolet irradiation and heat treatment after forming the lubricating layer. This improves the adhesion of the lubricating layer to the protective layer.

Advantages of this Invention

According to this invention, it is possible to provide a lubricant compound for a magnetic disk that can realize a further reduction in magnetic spacing, that is excellent in durability, particularly in LUL durability and alumina resistance, and that has high reliability even with the low flying height of a magnetic head following the rapid increase in recording density in recent years and with the very strict requirement for environmental resistance following the diversification of applications, and further to provide a magnetic disk using such a lubricant compound and a method of manufacturing such a magnetic disk.

MODE FOR CARRYING OUT THE INVENTION

Figure 1:
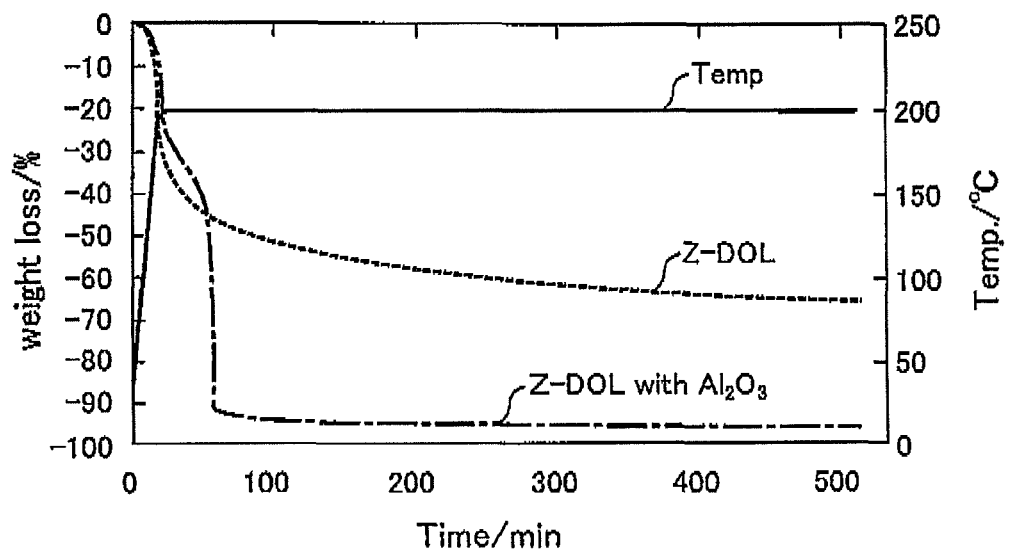
FIG. 1 is a diagram showing the results of alumina resistance evaluation of a lubricant according to a comparative example.

Hereinbelow, this invention will be described in detail based on an embodiment thereof.

A lubricant compound for a magnetic disk according to this invention is a lubricant compound to be contained in a lubricating layer of a magnetic disk having at least a magnetic layer, a protective layer, and the lubricating layer formed in this order over a substrate, wherein the lubricant compound comprises a compound which has a perfluoropolyether main chain in a structure thereof, an aromatic group located at a position except each end of a molecule thereof, and a polar group at each end of the molecule.

As the aromatic group in this case, use may be made of, for example, a phenyl group as a most preferable example, but alternatively, use may be made of a naphthylene group, a biphenylene group, a phthalimidyl group, an aniline group, or the like. The number of aromatic group within a single molecule may not be restricted to unity but a plurality of (for example, two) aromatic groups may be included within the single molecule. The aromatic group may have an appropriate substituent.

Thus, the lubricant compound according to this invention may be specified by a compound which has an aromatic group, such as a phenyl group, located at a position except each end (for example, at an approximate center) of a chain molecule having a perfluoropolyether main chain in a structure thereof and which has polar groups at both ends of the molecule. In order to allow the function and effect of this invention to be exhibited more preferably, the compound preferably has an additional polar group at a position adjacent to the aromatic group in the molecule. For example, it is particularly preferable that the compound have respective polar groups on both sides of the aromatic group present in the molecule.

In the lubricant compound according to this invention, the number of polar groups in one molecule is preferably 7 or less in order to adequately suppress the interaction between the molecules of the lubricant or the interaction (interaction in a molecule) due to attraction between the polar groups of the lubricant and to suppress attraction of contaminants and the like and transfer or shift of the lubricant to the head.

As the polar group in this case, it needs to be a polar group that causes the occurrence of suitable interaction between the lubricant and the protective layer when the lubricant is formed into a film on the protective layer. For example, use may be made of a hydroxyl group (—OH), an amino group (—$NH_2$), a carboxyl group (—COOH), an aldehyde group (—COH), a carbonyl group (—CO—), a sulfonic group (—$SO_3H$), or the like. Among them, the hydroxyl group is particularly preferable as the polar group. This is because the hydroxyl group has a large interaction with the protective layer, particularly a carbon-based protective layer, and thus can enhance the adhesion between the lubricating layer and the protective layer.

According to the lubricant compound of this invention described above, it is considered that the aromatic groups of the lubricant molecules and the protective layer approach each other due to π-π interaction therebetween and, by this interaction, the lubricant adheres to the protective layer. That is, by introducing the aromatic groups located at the position except each end of the lubricant molecules, it is possible to allow the lubricant to be stably present on the medium in the state where the bulkiness of the lubricant molecules is minimized and the lubricant molecules are more flattened. Therefore, when applied on the disk surface, the lubricant molecules are fixed at the positions of the aromatic groups to the protective layer so that it is possible to form the lubricating layer suppressed in bulkiness of the lubricant molecules on the protective layer and thus to form the thin lubricating layer. Further, it is possible to form the lubricating layer that can sufficiently cover the surface of the protective layer (the lubricating layer with a high coverage ratio) even if the thickness of the lubricating layer is reduced.

Further, since the interaction between the molecules of the lubricant or the interaction due to attraction between the polar groups of the lubricant is suppressed, the polar groups (e.g. hydroxyl groups) present at the ends of the lubricant molecules are effectively bonded to active sites on the protective layer and thus the adhesion of the lubricating layer can be improved.

Since the lubricant compound of this invention has the aromatic groups in the molecules thereof and a Lewis acid such as alumina is preferentially attracted to the aromatic groups in the molecules, decomposition at main chain portions of the perfluoropolyether-based lubricant due to alumina does not easily occur and, as a result, there are obtained the alumina resistance and the LUL durability that can ensure sufficient long-term stability.

Examples of lubricant compounds according to this invention are given below, but this invention is not limited thereto. Herein, it is to be noted that the following exemplary compounds No. 1 to No. 3 and No. 5 include phenyl groups as the aromatic groups while the exemplary compound No. 4 includes a naphthylene group as the aromatic group. In addition, the numbers of the hydroxyl groups in the exemplary compounds No. 1 to No. 5 are equal to 4, 6, 4, 2, and 6, respectively.

Exemplified Compounds

No. 1

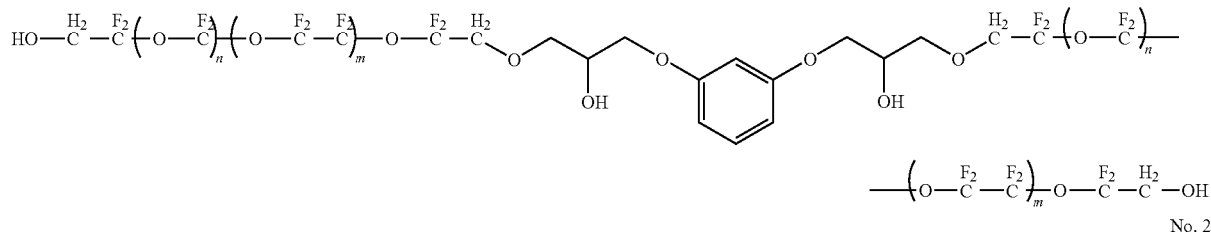

No. 2

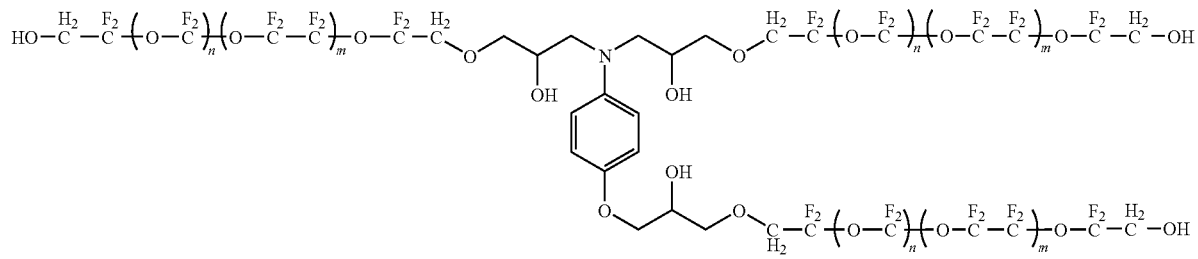

Exemplified Compounds

No. 3

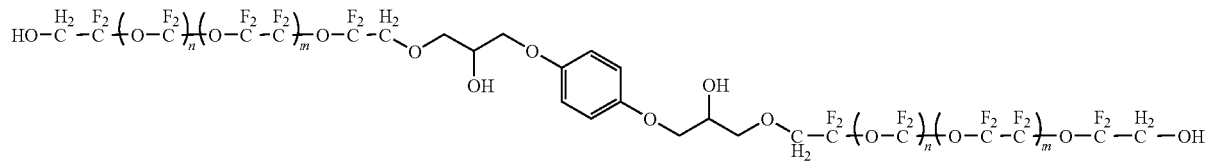

Exemplified Compounds

No. 4

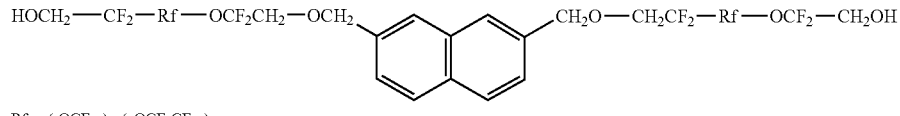

No. 5

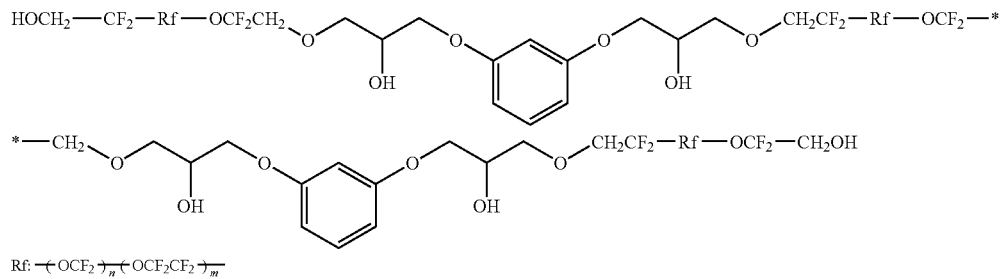

In the chemical formulas expressing the lubricant compounds of this invention exemplified above, m and n each represent an integer of 1 or more.

The lubricant compound of this invention can be obtained by, for example, the following synthetic method.

An example of a synthetic scheme of the above-exemplified lubricant compound No. 1 is shown below.

the range of 1,000 to 6,000. This is because recoverability can be provided by appropriate viscosity, suitable lubricating performance can be exhibited, and, further, excellent heat resistance can also be provided.

The lubricant compound according to this invention can be obtained as a lubricant compound with a high molecular weight by the use of, for example, the above-mentioned

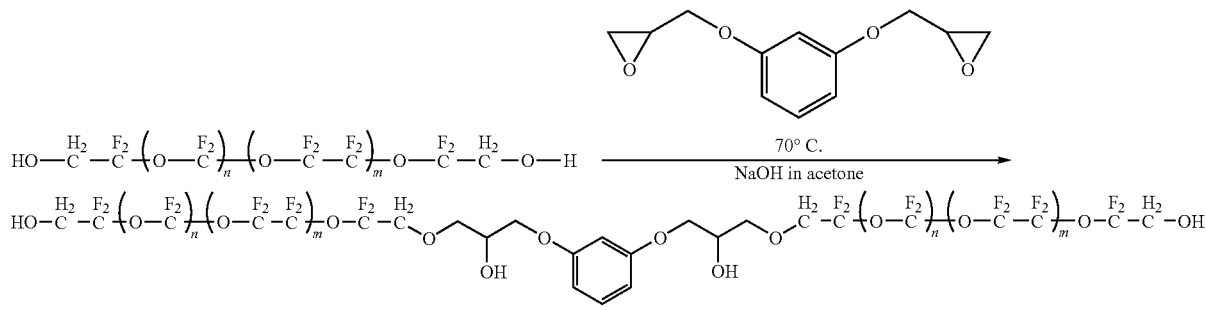

As a method of manufacturing the lubricant compound according to this invention, use is preferably made of a manufacturing method in which, as shown in the above synthetic scheme, a perfluoropolyether compound having a perfluoropolyether main chain in a molecule thereof is reacted, under an alkaline condition, with a compound having, for example, epoxy groups and an aromatic group (e.g. resorcinol diglycidyl ether).

The above-exemplified lubricant compound No. 2 can also be obtained by, according to the above synthetic scheme, reacting, under an alkaline condition, a perfluoropolyether compound having a perfluoropolyether main chain in a molecule thereof with, for example, the following compound having epoxy groups and an aromatic group.

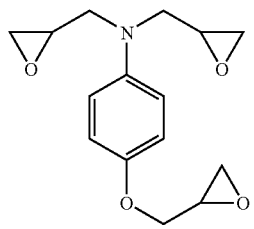 [SMILES: c1cc(N(CC2CO2)CC2CO2)ccc1OCC1CO1]

The above-exemplified lubricant compound No. 3 can be obtained, like the above-exemplified lubricant compound No. 1, by the use of a para-isomer (for example, hydroquinone diglycidyl ether) used in synthesizing the above-exemplified lubricant compound No. 1.

In addition, the above-exemplified lubricant compound No. 4 may be obtained, like the above-exemplified lubricant compound No. 1, by using 2,7-bis(bromomethyl)naphthalene instead of the resorcinol diglycidyl ether used in synthesizing the above-exemplified lubricant compound No. 1. Moreover, the above-exemplified lubricant compound No. 5 may be obtained in a manner similar to the exemplary lubricant compound No. 1 except that perfluoropolyether compound is made to react by 3 equivalents with the resorcinol diglycidyl ether.

The molecular weight of the lubricant compound according to this invention is not particularly limited, but, for example, the number-average molecular weight (Mn) is preferably in the range of 1,000 to 10,000 and more preferably in manufacturing method and thus it is possible to suppress a reduction in molecular weight due to thermal decomposition. Therefore, when a magnetic disk is manufactured using such a lubricant, it is possible to improve the heat resistance thereof. Because of the further reduction in magnetic head flying height (5 nm or less) following the increase in recording density in recent years, the possibility becomes high that contact or friction between a magnetic head and the surface of a magnetic disk frequently occurs. When the magnetic head is brought in contact with the surface of the magnetic disk, it may happen that the magnetic head does not immediately go out of contact with the surface of the magnetic disk, but slides with friction for a while. Further, because of recording/reproduction performed by the high-speed rotation of a magnetic disk in recent years, heat due to contact or friction is generated more than conventional. Therefore, it is concerned that the possibility becomes higher than conventional that a material of a lubricating layer on the surface of the magnetic disk is thermally decomposed due to the generation of such heat, so that data read/write is subjected to a failure due to adhesion, to a magnetic head, of the lubricant thermally decomposed to decrease in molecular weight and increase in fluidity. Further, in consideration of data recording/reproduction in the state where a magnetic head and a magnetic disk are in contact with each other in near future, the influence of heat generation due to the constant contact is further concerned. Taking this situation into account, it is desired that heat resistance required for a lubricating layer be further improved, and thus the lubricant of this invention is suitable.

In the case of obtaining the lubricant compound of this invention by the above-mentioned synthetic method, the number-average molecular weight (Mn) is preferably set to the range of 1,000 to 10,000 by appropriate molecular weight fractionation. In this event, the method of molecular weight fractionation is not particularly limited, but, for example, use can be made of molecular weight fractionation by a gel permeation chromatography (GPC) method, molecular weight fractionation by a supercritical fluid extraction method, or the like.

This invention also provides a magnetic disk having at least a magnetic layer, a protective layer, and a lubricating layer formed in this order over a substrate, wherein the lubricating layer contains the lubricant compound of this invention.

When forming the lubricating layer by the use of the lubricant compound of this invention, it can be formed by using a solution in which the above-mentioned lubricant compound is dispersed and dissolved in a fluorine-based solvent or the like and coating the solution by, for example, a dipping method.

The lubricating layer forming method is, of course, not limited to the above-mentioned dipping method and use may alternatively be made of a film forming method such as a spin coating method, a spray method, or a paper coating method.

In this invention, in order to further improve the adhesion of the lubricant, in the form of the lubricating layer, to the protective layer, the magnetic disk may be subjected to a heat treatment by exposure to an atmosphere at, for example, 50° C. to 150° C. or may be subjected to ultraviolet (UV) irradiation after the formation of the lubricating layer. That is, the baking treatment or the UV treatment can be carried out as a post-treatment. As the post-treatment in this invention, it is preferable that at least UV treatment is performed which is favorable so as to make stronger chemical bonds between the protective layer and the aromatic groups included in the lubricant molecules and their neighborhoods. Moreover, it is also preferable to carry out both the baking treatment and the UV treatment as post-treatments.

The thickness of a conventional lubricating layer is normally about 15 Å to 18 Å, but in this invention, the lubricating layer can be thinner than conventional and can be a thin film with a thickness of, for example, about 10 Å to 13 Å. If it is less than 10 Å, the coverage to the protective layer may be insufficient.

As the protective layer in this invention, a carbon-based protective layer can be preferably used. Particularly, an amorphous carbon protective layer is preferable. With the protective layer being particularly the carbon-based protective layer, the interaction between the polar groups (e.g. hydroxyl groups) of the lubricant according to this invention and the protective layer is further enhanced so that the function and effect of this invention are further exhibited, which is thus preferable.

In this invention, the carbon-based protective layer is preferably a composition gradient layer containing, for example, nitrogen on its lubricating layer side and hydrogen on its magnetic layer side. As a method of making the protective layer contain nitrogen in a part adjacent to the lubricating layer, use may be made of either a method of implanting nitrogen ions by treating a surface of the protective layer with nitrogen plasma after the protective layer is deposited or a method of depositing a nitriogenated carbon layer. Since such a method can further improve adhesion of the lubricant layer to the protective layer, this invention is more advantageous in that it is possible to obtain a lubricant layer which is thinner in thickness and which is excellent in coverage ratio.

When using the carbon-based protective layer in this invention, it can be formed, for example, by a DC magnetron sputtering method, but it is preferably an amorphous carbon protective layer particularly formed by a plasma CVD method. Being formed by the plasma CVD method, the surface of the protective layer becomes uniform and dense. Therefore, it is preferable that the lubricating layer by this invention be formed on the protective layer with a smaller surface roughness formed by the CVD method.

In this invention, the thickness of the protective layer is preferably set to 20 Å to 70 Å. If it is less than 20 Å, the performance as the protective layer may be lowered. If it exceeds 70 Å, it is not preferable in terms of a reduction in film thickness.

In the magnetic disk of this invention, the substrate is preferably a glass substrate. The glass substrate is rigid and excellent in smoothness and thus is suitable for an increase in recording density. As the glass substrate, an aluminosilicate glass substrate, for example, may be used and, particularly, a chemically strengthened aluminosilicate glass substrate is preferable.

In this invention, the main surface of the substrate is preferably ultra-smooth with Rmax of 3 nm or less and Ra of 0.3 nm or less. Rmax and Ra herein referred to are based on the JIS B0601 standard.

The magnetic disk obtained by this invention has at least the magnetic layer, the protective layer, and the lubricating layer over the substrate. In this invention, the magnetic layer is not particularly limited and may be an in-plane magnetic recording type magnetic layer or a perpendicular magnetic recording type magnetic layer. However, the perpendicular magnetic recording type magnetic layer is preferable for realizing the rapid increase in recording density in recent years. Particularly, if it is a CoPt-based magnetic layer, high coercive force and high reproduction output can be achieved, which is thus preferable.

In a preferable perpendicular magnetic recording disk as a magnetic disk of this invention, an underlayer may be provided between a substrate and a magnetic layer if necessary. Further, an adhesive layer, a soft magnetic layer, and so on may be provided between the underlayer and the substrate. In this case, as the underlayer, use may be made of, for example, a Cr layer, a Ta layer, a Ru layer, a CrMo alloy layer, a CoW alloy layer, a CrW alloy layer, a CrV alloy layer, or a CrTi alloy layer and, as the adhesive layer, use may be made of, for example, a CrTi alloy layer, a NiAl alloy layer, or an AlRu alloy layer. Further, as the soft magnetic layer, use may be made of, for example, a CoZrTa alloy layer.

As a perpendicular magnetic recording disk suitable for an increase in recording density, it preferably has a structure in which an adhesive layer, a soft magnetic layer, an underlayer, a magnetic layer (perpendicular magnetic recording layer), a carbon-based protective layer, and a lubricating layer are provided over a substrate. In this case, it is also preferable to provide an auxiliary recording layer on the perpendicular magnetic recording layer through an exchange coupling control layer interposed therebetween.

According to this invention, since it is possible to form a lubricating layer in the form of a thin uniform coating film having high adhesion to a protective layer, a further reduction in magnetic spacing can be realized. Further, it is possible to obtain a magnetic disk excellent in durability, particularly in LUL durability and alumina resistance, and having high reliability even with the low flying height (5 nm or less) of a magnetic head following the rapid increase in recording density in recent years and with the very strict requirement for environmental resistance following the diversification of applications.

That is, the magnetic disk of this invention is suitable as a magnetic disk adapted to be mounted in a magnetic disk device of, particularly, the LUL system. Because of the further reduction in magnetic head flying height following the introduction of the LUL system, the magnetic disk is required to stably operate even in the case of an ultra-low flying height of, for example, 5 nm or less. Therefore, the magnetic disk of this invention having high reliability even with the low magnetic head flying height is suitable therefor.

EXAMPLES

Hereinbelow, this invention will be described in further detail with reference to Examples.

Example 1

A magnetic disk of Example 1 has an adhesive layer, a soft magnetic layer, a first underlayer, a second underlayer, a magnetic layer, a carbon-based protective layer, and a lubricating layer which are formed in this order over a substrate.

(Manufacture of Lubricant)

The above-exemplified lubricant compound No. 1 was manufactured according to the above synthetic scheme in the following manner.

The lubricant compound was manufactured by reacting, under an alkaline condition (NaOH), a perfluoropolyether compound having a perfluoropolyether main chain in a molecule thereof and having hydroxyl groups at both ends in the molecule (see the above synthetic scheme) with resorcinol diglycidyl ether.

A lubricant comprising the compound thus obtained was properly subjected to molecular weight fractionation by the supercritical fluid extraction method.

(Manufacture of Magnetic Disk)

A 2.5-inch glass disk (outer diameter: 65 mm, inner diameter: 20 mm, disk thickness: 0.635 mm) made of a chemically strengthened aluminosilicate glass was prepared as a disk substrate. The main surface of the disk substrate was mirror-polished to Rmax of 2.13 nm and Ra of 0.20 nm.

On this disk substrate, a Ti-based adhesive layer, a Fe-based soft magnetic layer, a first underlayer of Ru, a second underlayer of Ru, and a magnetic layer of CoCrPt were formed in this order in an Ar gas atmosphere by the DC magnetron sputtering method. This magnetic layer is a perpendicular magnetic recording type magnetic layer.

Subsequently, a diamond-like carbon protective layer was formed to a thickness of 50 Å by the plasma CVD method.

Then, a lubricating layer was formed in the following manner.

There was prepared a solution in which the lubricant (Mn measured by the NMR method was 2800 and the molecular weight dispersion was 1.10) comprising the compound (the above-exemplified lubricant compound No. 1) of this invention manufactured as described above and subjected to the molecular weight fractionation by the supercritical fluid extraction method was dispersed and dissolved in a fluorine-based solvent, Vertrel XF (trade name) manufactured by DuPont-Mitsui Fluorochemicals Co., Ltd., at a concentration of 0.2 wt %. Using this solution as a coating solution, a magnetic disk formed with the layers up to the protective layer was immersed therein and coated therewith by the dipping method, thereby forming the lubricating layer.

After forming the lubricating layer, the magnetic disk was heat-treated in a vacuum furnace at 130° C. for 90 minutes. The thickness of the lubricating layer was measured by a Fourier transform infrared spectrophotometer (FTIR) and it was 12 Å. The lubricating layer coverage was 80% or more and thus was excellent. In this manner, the magnetic disk of Example 1 was obtained.

Then, the lubricant and the magnetic disk of Example 1 were evaluated by the following test methods.

(1) First, an alumina resistance evaluation test was performed for the lubricant used in Example 1.

The lubricant was added with 20% alumina ($Al_2O_3$) and maintained in a nitrogen gas ($N_2$) atmosphere at a constant temperature of 250° C. for 500 minutes, thereby performing a thermal weight analysis.

Figure 2:
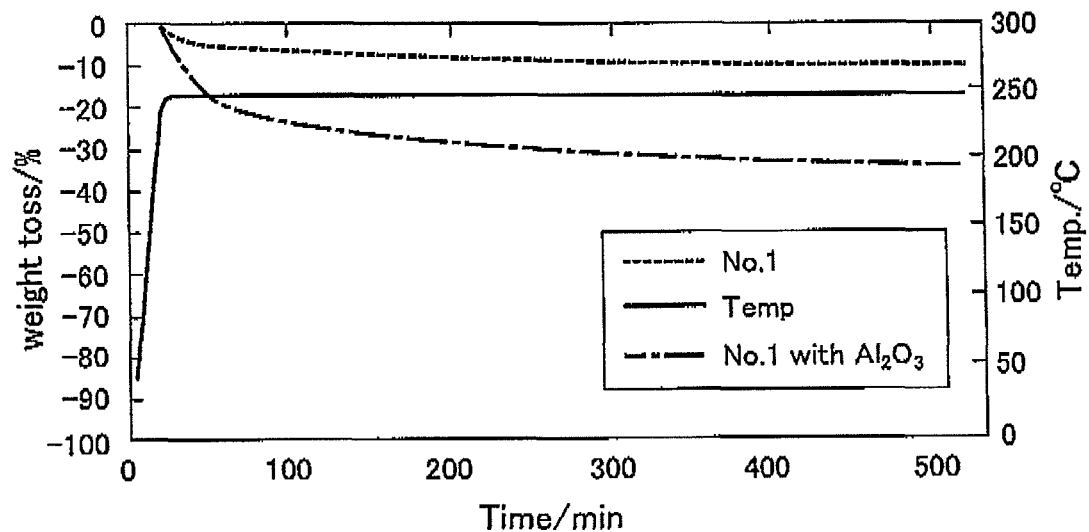
FIG. 2 is a diagram showing the results of alumina resistance evaluation of a lubricant according to this invention.

FIG. 2 shows the results thereof. With respect to the lubricant of this invention used in Example 1, the weight loss ratio when alumina was added (curve given by an alternate long and short dash line in FIG. 2) was about 30% or less. Thus, it was seen that the lubricant used in Example 1 was excellent in alumina resistance, i.e. decomposition due to alumina did not easily occur. Further, the weight loss ratio when no alumina was added was about 10% or less and thus it was also seen that the lubricant used in Example 1 was excellent in heat resistance.

(2) Then, a LUL (load/unload) durability test was performed for evaluating the LUL durability of the magnetic disk.

A LUL-system HDD (5400 rpm rotation type) was prepared and a magnetic head with a flying height of 5 nm and the magnetic disk of Example 1 were mounted therein. A slider of the magnetic head was a NPAB (negative pressure air bearing) slider and was mounted with a magnetoresistive effect element (GMR element) as a reproducing element. A shield portion was made of a FeNi-based permalloy alloy. By causing the LUL-system HDD to continuously repeat the LUL operations, the number of LUL times endured by the magnetic disk up to the occurrence of failure was measured.

As a result, the magnetic disk of Example 1 endured the LUL operations of 900,000 times with no failure at an ultra-low flying height of 5 nm. In a normal HDD using environment, use for about 10 years is generally required for the number of LUL times to exceed 400,000 times. Since a magnetic disk is currently judged to be preferable if it endures 600,000 times or more, it can be said that the magnetic disk of Example 1 has very high reliability.

The surface of the magnetic disk after the LUL durability test was observed in detail using an optical microscope and an electron microscope and was found to be excellent, i.e. no abnormality such as damage or dirt was observed. Further, the surface of the magnetic head after the LUL durability test was observed in detail using an optical microscope and an electron microscope and was found to be excellent, i.e. no abnormality such as damage or dirt was observed and, further, no lubricant adhesion to the magnetic head or no corrosion failure was observed.

For evaluating the thermal properties, the LUL durability test was performed in atmospheres of −20° C. to 50° C. With the magnetic disk of Example 1, no particular failure occurred and the good results were obtained.

Comparative Example

As a lubricant, use was made of a perfluoropolyether-based lubricant commercially available, namely, Fomblin Z-DOL (trade name) manufactured by Solvay Solexis, Inc., having been subjected to molecular weight fractionation by the GPC method to have Mw of 2,000 and a molecular weight dispersion of 1.08. There was prepared a solution in which the above-mentioned lubricant was dispersed and dissolved in a fluorine-based solvent, Vertrel XF (trade name) manufactured by DuPont-Mitsui Fluorochemicals Co., Ltd. Using this solution as a coating solution, a magnetic disk formed with layers up to a protective layer was immersed therein and coated therewith by the dipping method, thereby forming a lubricating layer. Herein, the concentration of the coating solution was properly adjusted so that the lubricant coverage became approximately the same as that of the magnetic disk in Example 1. The thickness of the lubricating layer was 17 Å.

In Comparative Example, the magnetic disk was manufactured in the same manner as in Example 1 except the above-mentioned point.

Then, the commercially available lubricant was added with 20% alumina ($Al_2O_3$) and maintained in a nitrogen gas ($N_2$) atmosphere at a constant temperature of 200° C., lower than that in Example 1, for 500 minutes, thereby performing a thermal weight analysis. FIG. 1 shows the results of performing an alumina resistance evaluation test for the conventional lubricant. The weight loss ratio when alumina was added (curve given by an alternate long and short dash line (Z-DOL with $Al_2O_3$) in FIG. 1) was 90% or more and thus was very large (the weight loss ratio when no alumina was added was about 60% and thus was large). Accordingly, with respect to the lubricant according to the comparative example, decomposition due to alumina tends to occur and thus the possibility of a reduction in molecular weight is high.

A LUL durability test was performed for the magnetic disk of Comparative Example in the same manner as in Example 1. As a result, the magnetic disk of Comparative Example failed when the number of LUL times reached 400,000 times with an ultra-low flying height of 5 nm. The surface of the magnetic disk after the LUL durability test was observed in detail using an optical microscope and an electron microscope and, as a result, damage or the like was slightly observed. Further, the surface of a magnetic head after the LUL durability test was observed in detail using an optical microscope and an electron microscope and, as a result, lubricant adhesion to the magnetic head and corrosion failure were observed.

Example 2

In the same manner as in Example 1, an adhesive layer, a soft magnetic layer, a first underlayer, a second underlayer, a magnetic layer, and a carbon-based protective layer were formed and, further, a lubricating layer was formed on the protective layer by the use of the same lubricant as that in Example 1. After forming the lubricating layer, a magnetic disk was subjected to a heat treatment at 130° C. for 90 minutes and further subjected to ultraviolet irradiation. This ultraviolet irradiation was carried out for an irradiation time of 20 seconds or less by the use of an ultraviolet lamp with wavelength 185 nm: wavelength 254 nm=2:8 by the light intensity ratio. The thickness of the lubricating layer was measured by a Fourier transform infrared spectrophotometer (FTIR) and it was 12 Å. The lubricating layer coverage was 80% or more and thus was excellent. In this manner, the magnetic disk of Example 2 was obtained.

Then, a LUL durability test was performed for the magnetic disk of Example 2 in the same manner as in Example 1. As a result, the magnetic disk of Example 2 endured the LUL operations of 900,000 times with no failure at an ultra-low flying height of 5 nm. It can be said that the magnetic disk of Example 2 has very high reliability. The surface of the magnetic disk after the LUL durability test was observed in detail using an optical microscope and an electron microscope and was found to be excellent, i.e. no abnormality such as damage or dirt was observed. Further, the surface of a magnetic head after the LUL durability test was observed in detail using an optical microscope and an electron microscope and was found to be excellent, i.e. no abnormality such as damage or dirt was observed and, further, no lubricant adhesion to the magnetic head or no corrosion failure was observed.

Example 3

Manufacture of Lubricant

The above-exemplified lubricant compound No. 2 was manufactured according to the above synthetic scheme in the following manner.

The lubricant compound was manufactured by reacting, under an alkaline condition (NaOH), a perfluoropolyether compound having a perfluoropolyether main chain in a molecule thereof and having hydroxyl groups at both ends in the molecule (see the above synthetic scheme) with the above-mentioned compound having epoxy groups and an aromatic group.

A lubricant comprising the compound thus obtained was properly subjected to molecular weight fractionation by the supercritical fluid extraction method.

An adhesive layer, a soft magnetic layer, a first underlayer, a second underlayer, a magnetic layer, and a carbon-based protective layer were formed in the same manner as in Example 1.

Then, a lubricating layer was formed in the following manner. There was prepared a solution in which the lubricant (Mn measured by the NMR method was 4,200 and the molecular weight dispersion was 1.10) comprising the compound (the above-exemplified lubricant compound No. 2) of this invention manufactured as described above and subjected to the molecular weight fractionation by the supercritical fluid extraction method was dispersed and dissolved in a fluorine-based solvent, Vertrel XF (trade name) manufactured by DuPont-Mitsui Fluorochemicals Co., Ltd., at a concentration of 0.2 wt %. Using this solution as a coating solution, a magnetic disk formed with the layers up to the protective layer was immersed therein and coated therewith by the dipping method, thereby forming the lubricating layer.

After forming the lubricating layer, the magnetic disk was subjected to a heat treatment and ultraviolet irradiation under the same conditions as in Example 2. The thickness of the lubricating layer was measured by a Fourier transform infrared spectrophotometer (FTIR) and it was 12 Å. The lubricating layer coverage was 80% or more and thus was excellent. In this manner, the magnetic disk of Example 3 was obtained.

Then, an alumina resistance evaluation test was performed for the lubricant used in Example 3.

In the same manner as in Example 1, the lubricant was added with 20% alumina ($Al_2O_3$) and maintained in a nitrogen gas ($N_2$) atmosphere at a constant temperature of 250° C. for 500 minutes, thereby performing a thermal weight analysis. As a result, with respect to the lubricant of this invention used in Example 3, the weight loss ratio when alumina was added was about 30% or less. Thus, it was seen that the lubricant used in Example 3 was excellent in alumina resistance, i.e. decomposition due to alumina did not easily occur. Further, the weight loss ratio when no alumina was added was about 10% or less and thus it was also seen that the lubricant used in Example 3 was excellent in heat resistance.

Then, a LUL durability test was performed for the magnetic disk of Example 3 in the same manner as in Example 1. As a result, the magnetic disk of Example 3 endured the LUL operations of 900,000 times with no failure at an ultra-low flying height of 5 nm. It can be proved that the magnetic disk of Example 3 has very high reliability. The surface of the magnetic disk after the LUL durability test was observed in detail using an optical microscope and an electron microscope and was found to be excellent, i.e. no abnormality such as damage or dirt was observed. Further, the surface of a magnetic head after the LUL durability test was observed in detail using an optical microscope and an electron microscope and was found to be excellent, i.e. no abnormality such as damage or dirt was observed and, further, no lubricant adhesion to the magnetic head or no corrosion failure was observed.

Example 4

Manufacture of Lubricant

The above-exemplified lubricant compound No. 5 was manufactured in accordance with the above-mentioned synthesizing scheme in the following manner.

The lubricant compound was manufactured by making the resorcinol diglycidyl ether react, under an alkaline condition (NaOH), with a perfluoropolyether compound having a perfluoropolyether main chain in a molecule thereof and having hydroxyl groups at both ends in the molecule (see the above synthetic scheme). Such reaction was performed by making the resorcinol diglycidyl ether with the perfluoropolyether compound of 3 equivalents.

A lubricant comprising the compound thus obtained was properly subjected to molecular weight fractionation by the supercritical fluid extraction method.

An adhesive layer, a soft magnetic layer, a first underlayer, a second underlayer, a magnetic layer, and a carbon-based protective layer were successively formed in a manner similar to Example 1.

Then, a lubricating layer was formed in the following manner.

A solution was prepared in which the lubricant (Mn measured by the NMR method was 3,600 and the molecular weight dispersion was 1.10) comprising the lubricant compound (the above-exemplified lubricant compound No. 5) of this invention manufactured as described above and subjected to the molecular weight fractionation by the supercritical fluid extraction method was dispersed and dissolved in a fluorine-based solvent, Vertrel XF (trade name) manufactured by DuPont-Mitsui Fluorochemicals Co., Ltd., at a concentration of 0.2 wt %. Using this solution as a coating solution, a magnetic disk formed with the layers up to the protective layer was immersed therein and coated with the solution by the dipping method, thereby forming the lubricating layer.

After forming the lubricating layer, the magnetic disk was subjected to a heat treatment and ultraviolet irradiation under the same conditions as in Example 2. The thickness of the lubricating layer was measured by a Fourier transform infrared spectrophotometer (FTIR). As a result, the thickness was 12 Å. The lubricating layer coverage was 80% or more and thus was excellent. In this manner, the magnetic disk of Example 4 was obtained.

Then, an alumina resistance evaluation test was performed for the lubricant used in Example 4.

In the same manner as in Example 1, the lubricant was added with 20% alumina ($Al_2O_3$) and was maintained in a nitrogen gas ($N_2$) atmosphere at a constant temperature of 250° C. for 500 minutes, thereby performing a thermal weight analysis. As a result, with respect to the lubricant (No. 5) of this invention used in Example 4, the weight loss ratio when alumina was added was about 30% or less. Thus, it was seen that the lubricant (No. 5) used in Example 4 was excellent in alumina resistance, i.e. decomposition due to alumina did not easily occur. Further, the weight loss ratio when no alumina was added was about 10% or less and thus it was also seen that the lubricant (No. 5) used in Example 4 was excellent in heat resistance.

Then, a LUL durability test was performed for the magnetic disk of Example 4 in the same manner as in Example 1. As a result, the magnetic disk of Example 4 endured the LUL operations of 900,000 times with no failure at an ultra-low flying height of 5 nm. It can be proved that the magnetic disk of Example 4 has very high reliability. The surface of the magnetic disk after the LUL durability test was observed in detail using an optical microscope and an electron microscope and was found to be excellent, i.e. no abnormality such as damage or dirt was observed. Further, the surface of a magnetic head after the LUL durability test was observed in detail using an optical microscope and an electron microscope and was found to be excellent, i.e. no abnormality such as damage or dirt was observed and, further, no lubricant adhesion to the magnetic head or no corrosion failure was observed.

What is claimed is:

1. A lubricant compound to be contained in a lubricating layer of a magnetic disk having at least a magnetic layer, a protective layer, and the lubricating layer formed in this order over a substrate,
   wherein said lubricant compound comprises a compound which has a perfluoropolyether main chain in a structure thereof, an aromatic group located at a position except each end of a molecule thereof, and a polar group at each end of the molecule,
   wherein the aromatic group is selected from the group consisting of phenyl group, naphthylene group, biphenylene group, phthalimidyl group, and aniline group,
   wherein said lubricant compound further contains polar groups located at both sides of and adjacent to the aromatic group, and
   wherein each of the polar groups in the compound is selected from the group consisting of an amino group, a carboxyl group, an aldehyde group, a carbonyl group and a sulfonic group.

2. The lubricant compound according to claim 1, wherein the number of polar groups in the molecule of said compound is 7 or less.

3. The lubricant compound according to claim 1, wherein a number-average molecular weight of said compound contained in said lubricating layer falls within a range of 1,000 to 10,000.

4. A magnetic disk having at least a magnetic layer, a protective layer, and a lubricating layer formed in this order over a substrate,
   wherein said lubricating layer contains the lubricant compound according to claim 1.

5. The magnetic disk according to claim 4, wherein said protective layer is a carbon-based protective layer formed by a plasma CVD method.

6. The magnetic disk according to claim 5, wherein said protective layer includes nitrogen at a part contacted with the lubricant layer.

7. The magnetic disk according to claim 4, wherein said magnetic disk is adapted to be mounted in a magnetic disk device of a load/unload system as a start/stop mechanism.

8. A method of manufacturing a magnetic disk having at least a magnetic layer, a protective layer, and a lubricating layer formed in this order over a substrate,
   wherein said lubricating layer is formed by forming on said protective layer a film of a lubricant composition containing the lubricant compound according to claim 1.

9. The method according to claim 8, comprising carrying out ultraviolet irradiation or carrying out both ultraviolet irradiation and heat treatment to said magnetic disk after forming said lubricating layer.

\* \* \* \* \*